United States Patent [19]
Lew et al.

[11] Patent Number: 5,455,588
[45] Date of Patent: Oct. 3, 1995

[54] METHOD FOR DETERMINING TARGET VELOCITY BY MEASURING PHASE SHIFT

[76] Inventors: Hyok S. Lew; yon S. Lew, both of 7890 Oak St., Arvada, Colo. 80005

[21] Appl. No.: 24,222

[22] Filed: Mar. 1, 1993

[51] Int. Cl.⁶ .................................................. G01S 13/53
[52] U.S. Cl. .................... 342/104; 342/105; 342/109
[58] Field of Search .................................. 342/104, 105, 342/109, 110, 111

[56] References Cited

U.S. PATENT DOCUMENTS

| | | | |
|---|---|---|---|
| Re. 31,851 | 3/1985 | Bachman | 342/104 |
| 3,576,565 | 4/1971 | Schulz | 342/118 |
| 3,745,575 | 7/1973 | Kikuchi | 342/22 |
| 3,778,830 | 12/1973 | Joseph | 342/149 |
| 4,035,760 | 7/1977 | Asbury et al. | 342/109 X |
| 4,107,659 | 8/1978 | Massa | 342/28 X |
| 4,146,890 | 3/1979 | Klensch | 342/105 |
| 4,160,250 | 7/1979 | Butler et al. | 342/105 |
| 4,177,463 | 12/1979 | Andermo | 342/105 |
| 4,860,014 | 8/1989 | Shores et al. | 342/105 |
| 4,942,404 | 7/1990 | Kefer | 342/418 |
| 5,055,849 | 10/1991 | Andersson et al. | 342/104 |
| 5,157,402 | 10/1992 | Zagar et al. | 342/104 |
| 5,162,862 | 11/1992 | Bartram et al. | 342/127 X |
| 5,177,487 | 1/1993 | Taylor, Jr. et al. | 342/159 |
| 5,260,708 | 11/1993 | Auterman | 342/25 |

*Primary Examiner*—John B. Sotomayor

[57] ABSTRACT

A method for determining velocity of a target object comprises transmitting a propagating wave emitted from a wave transmitter and detecting a reflected wave reflected back by the target object by using a wave receiver, and determining of a phase angle difference between two alternating electrical signals respectively representing the transmitted wave departing the wave transmitter and the reflected wave arriving at the wave receiver, wherein the velocity of the target object is determined as a function of the time rate of change of the phase angle difference between the two alternating electrical signals.

20 Claims, 2 Drawing Sheets

METHOD FOR DETERMINING TARGET VELOCITY BY MEASURING PHASE SHIFT

FIELD OF INVENTION

This invention relates to a method for determining velocity of a target object by measuring time rate of change of phase angle difference between the transmitted wave emitted from a wave transmitter and the reflected wave reflected back from the target object and detected by a wave receiver, which method may be applied in determining the velocity of a target object by using radars, lasers, microwave devices, ultrasonic devices and sonars.

BACKGROUND OF INVENTION

In the conventional method for determining position and/or velocity of a target object by comparing the transmitted wave emitted from a wave transmitter and the reflected wave reflected back by the target object, the distance between the wave transmitter and the target object is determined by measuring the time interval between the emission of a pulse of the transmitted wave and the reception of a pulse of the reflected wave, while the velocity of the target object is determined from the difference in the frequency between the transmitted wave and the received wave resulting from the Doppler effect. In the above-described conventional methods, the information on the position and/or velocity of the target object is obtained by analyzing the wave form characteristics of the received signal in the time domain or frequency domain in comparison with the wave form of the transmitted wave. The present invention teaches methods for determining the velocity of a target object by measuring the phase angle difference between the transmitted wave and the received wave and determining the velocity of the target object as a function of the time rate of change of the phase angle difference, which methods teach how to measure the velocity of a target object by using an ordinary radar without employing the principles of the Doppler radar.

BRIEF SUMMARY OF INVENTION

The primary object of the present invention is to provide methods for determining the velocity of a target object by measuring the time rate of change of the phase angle difference between the transmitted wave emitted from a wave transmitter and the reflected wave reflected back by the target object and detected by a wave receiver, which methods do not require the measurement of the frequency shift caused by the Doppler effect.

Another object is to provide methods for eliminating the transmitted wave detected by the wave receiver together with the reflected wave and obtaining the phase angle difference between the transmitted wave and the reflected wave by performing a comparative analysis of the transmitted wave and the received wave.

A further object is to teach how to convert an ordinary radar only capable of determining the position of a target object into a radar capable of determining the velocity of the target object without incorporating the operating principles of the Doppler radar.

Yet another object is to provide methods for determining a distance of very small magnitude between two surfaces.

Yet a further object is to provide methods for determining the phase angle difference between two alternating electrical signals of harmonic modes oscillating at the same frequency.

These and other objects of the present invention will become clear as the description thereof progresses.

BRIEF DESCRIPTION OF FIGURES

The present invention may be described with a greater clarity and specificity by referring to the following figures.

DESCRIPTION OF PREFERRED METHODS

Figure 1:
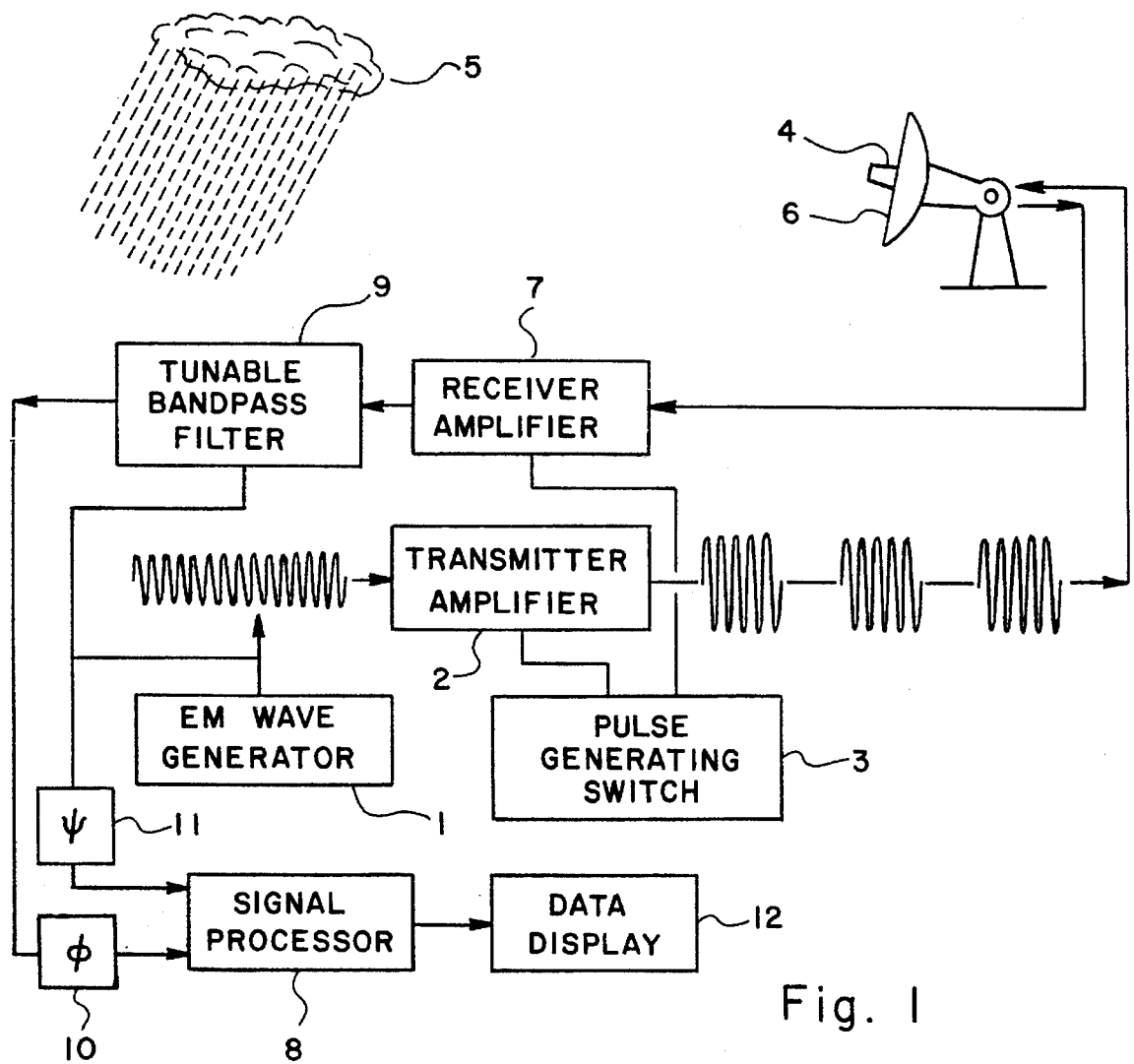
FIG. 1 illustrates a version of operating principles of the methods taught by the present invention.

In FIG. 1 there is illustrated a radar system operating on the principles taught by the methods of the present invention. An electromagnetic wave generator 1 generates an alternating electrical signal, which signal is amplified by a transmitter amplifier 2 operating under a switching mode controlled by a pulse generating switch 3 that turns on and off the output from the transmitter amplifier 2, and consequently, a series of pulsed packets of the alternating electrical current is supplied to the transmitter antenna 4 that emits a series of pulsed packets of traveling wave or transmitted wave. The transmitted wave becomes reflected by a target object 5 of natural origin such as a storm cloud, a mountain, a hill, etc., and of man-made barriers such as an air plane, a ship, a ground vehicle, a building structure, etc. The reflected wave is directed to a receiving antenna 4 that also functions as the transmitter antenna by a reflector dish 6. The electromotive force generated by the received wave picked up by the dual function antenna 4 is amplified by a receiver amplifier 7 and supplied to a signal processor 8 through a band pass filter 9 tuned to the frequency of the transmitted wave emitted from the dual function antenna 4 and through a variable phase shifter 10. The alternating electrical signal energizing the dual function antenna 4 is branched off and supplied to the signal processor 8 through a variable phase shifter 11. The variable phase shifters 10 and 11 may be adjusted in such a way that the phase angle difference between two electrical signals respectively representing the transmitted wave and the received wave and supplied to the signal processor 8, is equal to the phase angle difference between the transmitted wave leaving the dual function antenna 4 and the reflected wave arriving at the dual function antenna 4. It is readily recognized that the above-mentioned condition can be satisfied by using only one of the two variable phase shifter 10 and 11, and consequently, one of them can be omitted. While the end results of the analysis establishing the theoretical foundations of the methods taught by the present invention do not depend on the condition that the phase angle difference between the alternating electrical signal $E_T$ representing the transmitted wave and the alternating electrical signal $E_R$ representing the received wave is equal to the phase angle difference between the transmitted wave leaving the antenna 4 and the reflected wave arriving at the antenna 4, the use of $E_T$ and $E_R$ satisfying such a condition greatly simplifies the mathematical analysis which follows. The two electrical signals $E_T$ and $E_R$ satisfying the above-mentioned condition are of the following forms:

$$E_T = A_T \sin\omega(t + \alpha), \quad (1)$$

and $$E_R = A_R \sin\omega\left[t - \left(\frac{2S}{C} - \alpha\right)\right], \quad (2)$$

where $A_T$ and $A_R$ are respectively the amplitude of the two alternating electrical signals supplied to the signal processor 8, $\omega$ is the common circular frequency of the two alternating electrical signals which may be the same as the circular frequency of the transmitted and received waves or equal to an integer fraction of the circular frequency of the transmitted and received waves, t is the time, S is the distance between the antenna 4 and the target object 5, C is the propagating speed of the wave through the air space, and $\alpha$ is an arbitrary reference phase angle, of which numerical value has no consequence to the end results of the analysis. It should be understood that the dual function antenna 4 transmits the transmitted wave in pulses and receives the reflected wave during a pause period between the pulses of the transmission. The information provided by the results of algorithms executed by the signal processor 8 is displayed by a data display 12.

Figure 2:
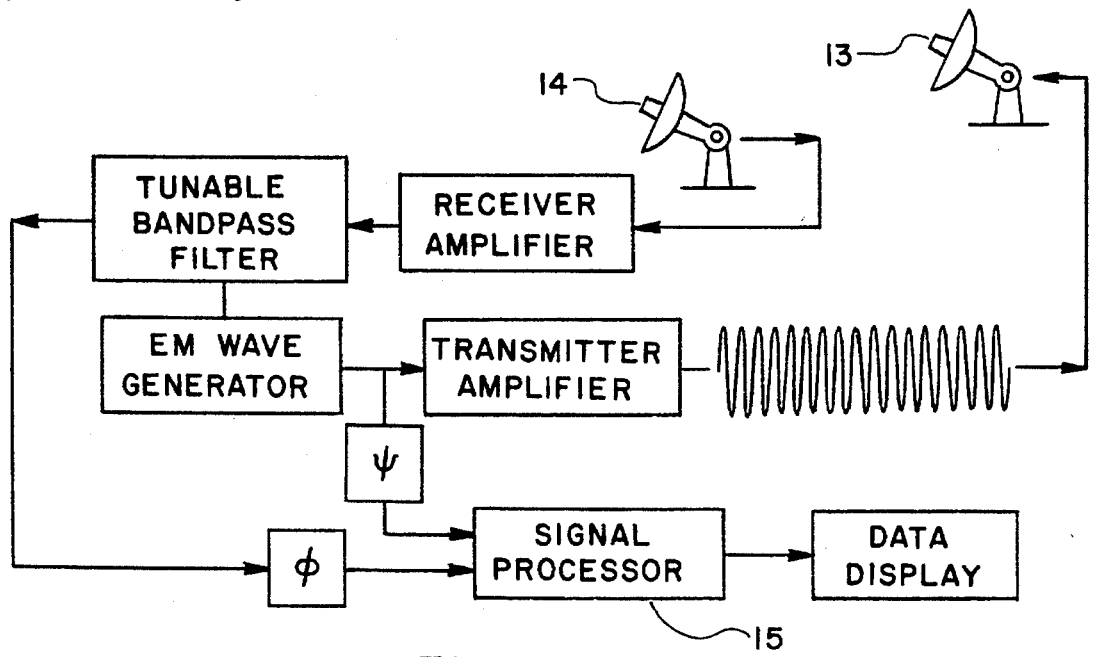
FIG. 2 illustrates another version of the operating principles of the methods taught by the present invention.

In FIG. 2 there is illustrated another radar system operating on the principles taught by the methods of the present invention. The transmitter antenna or the wave transmitter 13 emits the wave continuously in time. The receiver antenna or the wave receiver 14, that may be built into the wave transmitter 13, or disposed at the same location as the wave transmitter 13, or disposed at a location separated from the wave transmitter 13 by a distance L, receives the reflected wave as well as a portion of the transmitted wave directly reaching the wave receiver. The two alternating electrical signals respectively representing the transmitted wave emitted from the wave transmitter 13 and the received wave detected by the wave receiver 14, which are supplied to the signal processor 15 are of the following forms:

$$E_T = A_T \sin\omega(t + \alpha), \quad (3)$$

and $$E_R = A_R \sin\omega\left[t - \left(\frac{S_T + S_R}{C} - \alpha\right)\right] + A_{RT}\sin\omega\left[t - \left(\frac{L}{C} - \alpha\right)\right], \quad (4)$$

where $S_T$ and $S_R$ are respectively the distance from the target object to the wave transmitter 13 and the distance from the target object to the wave receive 14. The last term on the right hand side of equation (4) represents the transmitted wave traveled directly from the wave transmitter 13 to the wave receiver 14 and detected thereby, while the first term represents the reflected wave reflected by the target object and detected by the wave detector 14. Of course, the term on the right hand side of equation (3) represents the transmitted wave emitted by the wave transmitter 13. It should be noticed that equations (3) and (4) describes the operation of the radar system illustrated in FIG. 1 that now operates in a nonpulsed continuous mode in time, when the distance L between the wave transmitter 13 and the wave receiver 14 is set equal to zero.

It can be easily shown that equations (3) and (4) satisfy the following relationships:

$$E_R = A_R \sin\omega \frac{S_T + S_R}{C} + A_{RT}\sin\omega \frac{L}{C}, \quad (5)$$

when $E_T$ reaches a zero value, and $$E_R = A_R \cos\omega \frac{S_T + S_R}{C} + A_{RT}\cos\omega \frac{L}{C}, \quad (6)$$

when $E_T$ reaches a peak value.

Equations (3) and (4) also satisfy equations (5) and (6) with $E_R$ and $E_T$ interchanged. When equations (5) and (6) are combined to eliminate $A_{RT}$, the the following relationship is obtained:

$$e_R\Big|_{E_T=0} \cos\omega\frac{L}{C} - e_R\Big|_{E_T=\text{PEAK}} \sin\omega\frac{L}{C} = \sin\omega\left(\frac{S_T + S_R - L}{C}\right), \quad (7)$$

where $e_R$ is the normalized form of $E_R$, that is equal to $E_R$ divided by its amplitude $A_R$. It should be again noticed that, in equation (7), $e_R$ can be replaced by $e_T$ and $E_T$ can be replaced by $E_R$. When equation (7) is solved for $(S_T+S_R-L)/C$ and its time derivative is taken, the following equation is obtained:

$$\frac{dS_T}{dt} + \frac{dS_R}{dt} = \frac{C}{\omega}\frac{df(t)}{dt} \Big/ \sqrt{1 - [f(t)]^2}, \quad (8)$$

where $$f(t) = e_R\Big|_{E_T=0}\cos\omega\frac{L}{C} - e_R\Big|_{E_T=\text{PEAK}}\sin\omega\frac{L}{C} \quad (9)$$

In equations (9), $e_R$ can be replaced by $e_T$ and $E_T$ can be replaced by $E_R$. The parameters $\omega$, L and C appearing in equations (8) and (9) have known numerical values, which are stored in a memory bank of the signal processor 15, which signal processor executes the algorithm defined by equations (8) and (9), and calculates the sum of the time rate of changes of the distances from the target object to the wave transmitter and to the wave receiver. In a special case of the linear combination of the two terms appearing on the left hand side of equation (7) or on the right hand side of equation (9), wherein $\omega L/C$ is set equal to $n\pi$ or $(n+\frac{1}{2})\pi$ where n is equal to zero or an integer, the phase angle difference between the two alternating electrical signals respectively representing the transmitted wave and the received wave becomes a function of only one of the two terms forming the above-mentioned linear combination, and consequently, the algorithm determining the phase angle difference between the two alternating electrical signals becomes significantly simpler. When the wave receiver 14 is built into the wave transmitter 13, or disposed at the same location as the wave transmitter 13, whereby L is equal to Zero, equations (8) and (9) reduce to $$\frac{dS_T}{dt} = \frac{C}{2\omega}\frac{dg(t)}{dt} \Big/ \sqrt{1 - [g(t)]^2}, \quad (10)$$

where $$g(t) = e_R \Big|_{E_T = 0} . \qquad (11)$$

It should be again noticed that, in equation (11), $e_R$ can be replaced by $e_T$ and $E_T$ can be replaced by $E_R$. Substitution of equation (10) into equation (8) yields equation $$\frac{dS_R}{dt} = \frac{C}{\omega} \left\{ \frac{df(t)}{dt} / \sqrt{1-[f(t)]^2} - \frac{1}{2} \frac{dg(t)}{dt} / \sqrt{1-[g(t)]^2} \right\}. \qquad (12)$$

Equations (10) and (12) determines the vector velocity of the target object by the following process: Firstly, the time rate of change of distance between the target object and a first wave receiver built into the wave transmitter is determined as a function of time rate of change of the phase angle difference between two alternating electrical signals respectively representing the transmitted wave emitted from the wave transmitter and the reflected wave detected by the first wave receiver built into the wave transmitter, which phase angle difference is determined as a function of a normalized value of one of the two alternating electrical signal measured at an instant when the other of the two alternating electrical signal reaches a zero value. Secondly, the time rate of change of distance between the target object and a second wave receiver located away from the wave transmitter is determined as a function of time rate of change of the phase angle difference between two alternating electrical signals respectively representing the transmitted wave emitted from the wave transmitter and the reflected wave detected by the second wave receiver and the time rate of change of the distance between the target object and the first wave receiver, wherein the phase angle difference between the two alternating electrical signals is determined as a function of linear combination of a first value of one of the two alternating electrical signals measured at a first instant when the other of the two alternating electrical signals reaches a zero value, and a second value of one of the two alternating electrical signals measured at a second instant when the other of the two alternating electrical signals reaches a peak value. The vector velocity of the target object is constructed from the two components of the vector velocity determined by the above-described process by using the well known triangulation method. It should be understood that numerical values of one or both of the two alternating electrical signals, which determines the phase angle difference between the two alternating electrical signals, may be measured at every cycle thereof, or every tenth, or every hundredth, or every thousandth, or any other intermittent instants as dictated by the performance of the digitized sampling or measuring devices or digitizing system taking the numerical values of one or both of the two alternating electrical signals. It should be understood that the methods for determining the component of the vector velocity of the target object defined by equations (10) and (12) work with the transmitted wave emitted from the wave transmitter in a continuous mode as well as in a pulsed mode in time.

When the wave transmitter emits the wave in a pulsed mode in time in such a way that the returning wave reflected by a target object is detected by the wave receiver during a pause period between the pulses of the transmitted wave, $A_{RT}$ appearing in equations (5) and (6) vanishes, and consequently, equations (5) and (6) reduce to $$E_R = A_R \sin\omega \frac{S_T + S_R}{C}, \text{ when } E_T \text{ reaches a zero value}, \qquad (13)$$

and $$E_R = A_R \cos\omega \frac{S_T + S_R}{C}, \text{ when } E_T \text{ reaches a peak value}. \qquad (14)$$

The ratio of equation (13) to equation (14) yields equation $$\frac{E_R \Big|_{E_T = 0}}{E_R \Big|_{E_T = \text{PEAK}}} = \tan\omega \frac{S_T + S_R}{C}. \qquad (15)$$

The phase angle difference $\omega(S_T+S_R)/C$ between two alternating electrical signals respectively representing the transmitted wave and the reflected wave is a function of a ratio of a first value of one of the two alternating electrical signals measured at a first instant when the other of the two alternating electrical signals reaches a zero value to a second value of one of the two alternating electrical signals measured at a second instant when the other of the two alternating electrical signals reaches a peak value according to equation (15). The time derivative of the phase angle difference determined from equation (15) provides the following relationship:

$$\frac{dS_T}{dt} + \frac{dS_R}{dt} = \frac{C}{\omega} \frac{dh(t)}{dt} /\{1 + [h(t)]^2\}, \qquad (16)$$

where $$h(t) = \frac{E_R \Big|_{E_T = 0}}{E_R \Big|_{E_T = \text{PEAK}}} . \qquad (17)$$

For the wave receiver built into the wave transmitter as shown in FIG. 1 or the wave receiver disposed at the same location as the wave transmitter, equation (16) reduces to $$\frac{dS_T}{dt} = \frac{C}{2\omega} \frac{dh(t)}{dt} /\{1 + [h(t)]^2\}. \qquad (18)$$

According to equations (16) and (18), the vector velocity of the target object can be constructed from two components of the vector velocity determined by the following process: Firstly, the time rate of change of distance between the target object and a first wave receiver built into the wave transmitter is determined as a function of time rate of change of the phase angle difference between two alternating electrical signals respectively representing the transmitted wave emitted from the wave transmitter and the reflected wave detected by the first wave receiver, which phase angle difference is determined as a function of a first value of one of the two alternating electrical signals measured at a first instant when the other of the two alternating electrical signals reaches a zero value divided by a second value of one of the two alternating electrical signals measured at a second instant when the other of the two alternating electrical signals reaches a peak value. Then, the time rate of change of distance between the target object and a second wave receiver separated from the wave transmitter is determined as a function of time rate of change of the phase angle difference between two alternating electrical signals respectively representing the transmitted wave emitted from the wave transmitter and the reflected wave detected by the second wave receiver and the time rate of change of distance between the target object and the first wave receiver built into the wave transmitter, wherein the phase angle difference is determined as a function of a first value of one of the two alternating electrical signals measured at a first instant when the other of the two alternating electrical signals reaches a zero value divided by a second value of one of the two alternating electrical signals measured at a second instant when the other of the two alternating electrical signals reaches a peak value. It should be mentioned that equations (10) and (18) teach a highly economic way to convert an air-borne, space-borne, vehicle mounted, or ground based radar with a single transmitting-receiving antenna into a dual function radar that determines the location of a target object by using the conventional method and the velocity of the target object by using one of the methods taught by the present invention Such a conversion of the conventional single function radar to the dual function radar eliminates the need for the expensive Doppler radar in detecting the hazardous target object such as the microburst of an air-cloud mass endangering the flight safety of airplanes.

It can be shown that equations (3) and (4) satisfy the following relationships:

$$E_T \frac{dE_R}{dt} - \frac{dE_T}{dt} E_R = \quad (19)$$

$$A_T A_R \omega \sin\omega\left(\frac{S_T + S_R}{C}\right) + A_T A_{RT} \omega \sin\omega \frac{L}{C},$$

and $$\frac{dE_t}{dt} \frac{dE_R}{dt} + \omega^2 E_T E_R = \quad (20)$$

$$A_T A_R \omega^2 \cos\omega\left(\frac{S_T + S_R}{C}\right) + A_T A_{RT} \omega^2 \cos\omega \frac{L}{C}.$$

Equations (19) and (20) can be combined to eliminate the terms including $A_T A_{RT}$, which combination yields relationship $$\left(E_T \frac{dE_R}{dt} - \frac{dE_T}{dt} E_R\right)\cos\omega \frac{L}{C} - \quad (21)$$

$$\left(\frac{1}{\omega} \frac{dE_T}{dt} \frac{dE_R}{dt} + \omega E_T E_R\right)\sin\omega \frac{L}{C} =$$

$$A_R A_T \omega \sin\omega \frac{S_T + S_R - L}{C}.$$

In a special case of the linear combination of the two terms appearing on the left hand side of equation (21), wherein $\omega L/C$ is set to equal to $n\pi$ or $(n+\frac{1}{2})\pi$, where n is equal to zero or an integer, the phase angle difference $\omega(S_T+S_R-L)/C$ becomes a function of only one of the two terms forming the linear combination appearing on the left hand side of equation (21), and consequently, the algorithm determining the phase angle difference becomes significantly simpler. Equation (21) can be readily solved for the phase angle difference, and the time derivative of the phase angle difference provides the following relationship:

$$\frac{dS_T}{dt} + \frac{dS_R}{dt} = \frac{C}{\omega} \frac{dp(t)}{dt} / \sqrt{1-[p(t)]^2}, \quad (22)$$

where $$p(t) = \frac{1}{\omega}\left(e_T \frac{de_R}{dt} - \frac{de_T}{dt} e_R\right)\cos\omega \frac{L}{C} - \quad (23)$$

$$\left(\frac{1}{\omega^2} \frac{de_T}{dt} \frac{de_R}{dt} + e_T e_R\right)\sin\omega \frac{L}{C},$$

where e is the normalized form of E, that is equal to E divided by its amplitude. For the wave receiver built into the wave transmitter, equation (23) reduces to $$\frac{dS_T}{dt} = \frac{C}{2\omega} \frac{dq(t)}{dt} / \sqrt{1-[q(t)]^2}, \quad (24)$$

where $$q(t) = \frac{1}{\omega}\left(e_T \frac{de_R}{dt} - \frac{de_T}{dt} e_R\right). \quad (25)$$

The time rate of change of distance between the target object and a first wave receiver built into the wave transmitter is determined as a function of time rate of change of the phase angle difference between two alternating electrical signals respectively representing the transmitted wave emitted from the wave transmitter and the reflected wave detected by the first wave detector, which phase angle difference is determined as a function of the terms appearing on the right hand side of equation (25). The time rate of change of distance between the target object and a second wave receiver is determined as a function of time rate of change of the phase angle difference between two alternating electrical signals respectively representing the transmitted wave emitted from the wave transmitter and the reflected wave detected by the second wave receiver, and the time rate of change of distance between the target object and the first wave receiver, wherein the phase angle difference is determined as a function of the terms appearing on the right hand side of equation (23).

When the wave transmitter emits the wave in a pulsed mode in time in such a way that the returning wave reflected by the target object is received by the wave receiver during a pause period between the pulses of the transmitted wave, $A_{RT}$ appearing in equations (19) and (20) vanishes, and consequently, equations (19) and (20) reduce to $$E_T \frac{dE_R}{dt} - \frac{dE_T}{dt} E_R = A_T A_R \omega \sin\omega\left(\frac{S_T + S_R}{C}\right), \quad (26)$$

and $$\frac{dE_T}{dt} \frac{dE_R}{dt} + \omega^2 E_T E_R = A_T A_R \omega^2 \cos\omega\left(\frac{S_T + S_R}{C}\right). \quad (27)$$

The ratio of equation (26) to equation (27) provides the following relationship:

$$\frac{E_T \frac{dE_R}{dt} - \frac{dE_T}{dt} E_R}{\frac{1}{\omega} \frac{dE_T}{dt} \frac{dE_R}{dt} + \omega E_T E_R} = \tan\omega\left(\frac{S_T + S_R}{C}\right). \quad (28)$$

Equation (28) can be readily solved for the phase angle difference $\omega(S_T+S_R)/C$ and the time derivative of the phase angle difference determines the velocity of the target object by the following equation:

$$\frac{dS_T}{dt} + \frac{dS_R}{dt} = \frac{C}{\omega} \; \frac{du(t)}{dt} \; /\{1+[u(t)]^2\}, \quad (29)$$

where $$u(t) = \frac{E_T \frac{dE_R}{dt} - \frac{dE_T}{dt} E_R}{\frac{1}{\omega} \frac{dE_T}{dt} \frac{dE_R}{dt} + \omega E_T E_R} \quad (30)$$

For the wave receiver built into the wave transmitter, equation (29) reduces to $$\frac{dS_T}{dt} = \frac{C}{2\omega} \; \frac{du(t)}{dt} \; /\{1+[u(t)]^2\}. \quad (31)$$

The time rate of change of distance between the target object and a first wave receiver built into the wave transmitter is determined as a function of time rate of change of the phase angle difference between two alternating electrical signals respectively representing the transmitted wave emitted from the wave transmitter and the reflected wave detected by the first wave receiver, which phase angle difference is determined as a function the combination appearing on the right hand side of equation (30). The time rate of change of distance between the target object and a second wave receiver separated from the wave transmitter is determined as a function of time rate of change of the phase angle difference between two alternating electrical signals respectively representing the transmitted wave emitted from the wave transmitter and the reflected wave detected by the second wave receiver, and the time rate of change of distance between the target object and the first wave detector, wherein the phase angle difference is determined as a function of the combination appearing on the right hand side of equation (30). It should be mentioned that equations (24) and (31) in addition to equations (10) and (18) teach how to convert an air-borne, space-borne, vehicle mounted, or ground based radar capable of only detecting the position of a target object into a dual function radar capable of determining the position and velocity of the target object.

Figure 3:
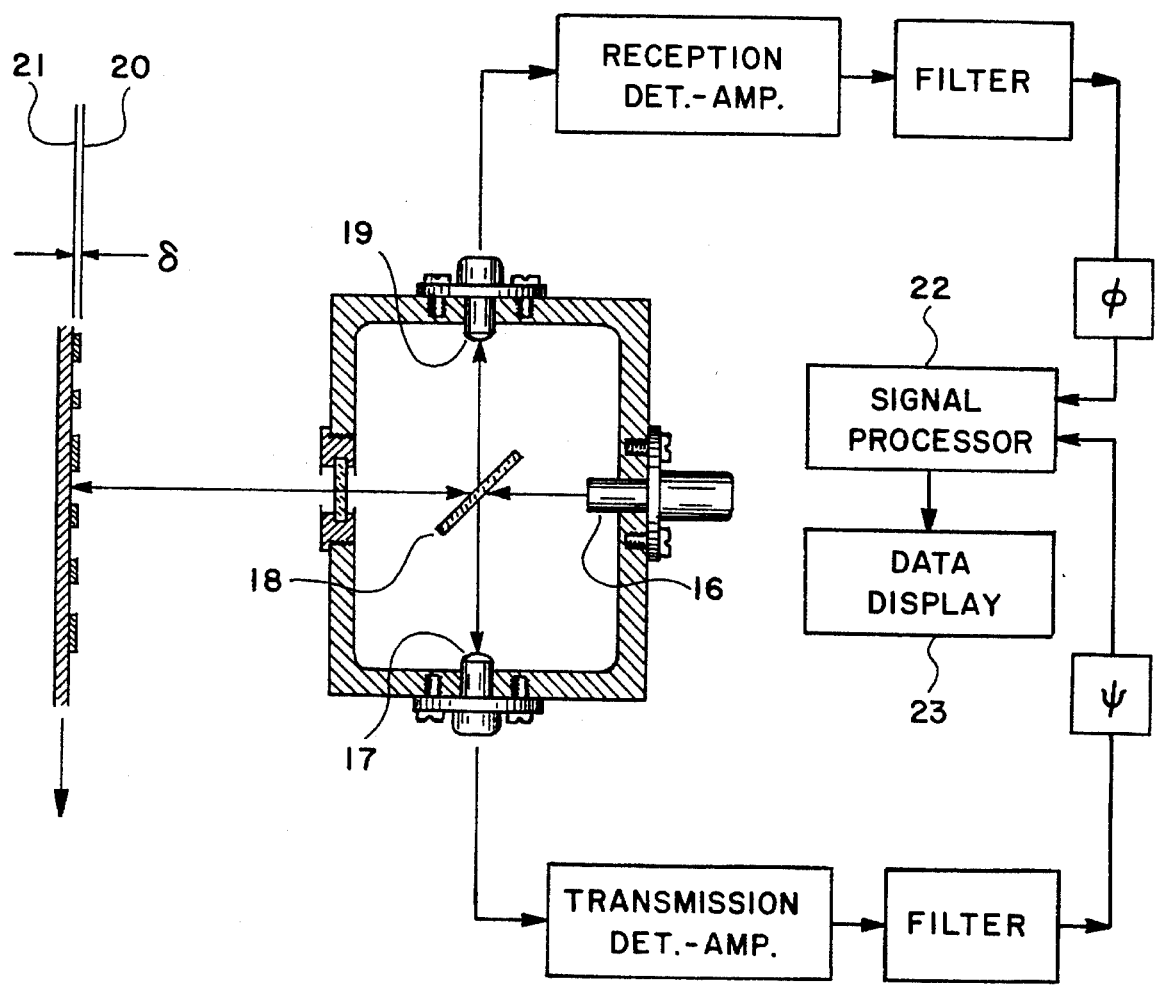
FIG. 3 illustrates a further version of the operating principles of the methods taught by the present invention.

In FIG. 3 there is illustrated an embodiment of the microwave or laser device that measures a difference δ of small magnitude between two surfaces. A source 16 of the microwave radiation or laser beam continuously emits an electromagnetic wave. The transmitted wave detector 17 converts the transmitted wave emitted from the radiation source 16 and reflected by the beam splitter 18 into a first electrical signal given by equation (4), while the reflected wave detector 18 converts the returning wave reflected back by the target surface 20 and by the beam splitter 18 into a second electrical signal given by equation (5). It can be easily shown by using equation (7) or (21) that the following relationship exists:

$$\delta = \frac{\sqrt{2} \; C}{\omega} \sin^{-1}\left[(1-v_1 v_2) - \sqrt{(1-v_1v_2)^2 - (v_1-v_2)^2}\right]^{1/2} \quad (32)$$

where $$v = e_R \Big|_{E_T=0} \cos\omega\frac{L}{C} - e_R \Big|_{E_T=\text{PEAK}} \sin\omega\frac{L}{C}, \quad (33)$$

or $$v = \frac{1}{\omega}\left(e_T\frac{de_R}{dt} - \frac{de_T}{dt} e_R \right)\cos\omega\frac{L}{C} - \left(\frac{1}{\omega^2} \frac{de_T}{dt} \frac{de_R}{t} + e_T e_R \right)\sin\omega\frac{L}{C}, \quad (34)$$

where the subscripts 1 and 2 respectively stand for the values of v(t) given by equation (32) or (33) obtained by using the reflected waves respectively reflected by the top surface 20 and the bottom surface 21. The normalized electrical signals $e_T$ and $e_R$ conditioned by the detector amplifiers, the filters and the variable phase shifters are supplied to the signal processor 22 that determines numerical value of δ by executing algorithm defined by equation (32). The result is displayed by the data display 23. It should be noticed that, in a special case of the linear combination of the two terms appearing on the right hand side of equation (33) or (34), wherein ωL/C is set equal to nπ or (n+½)π where n is equal to zero or an integer, only one of the two terms appearing on the right hand side of equation (33) or (34) survives, and consequently, algorithm determining numerical value given by equation (32) becomes significantly simplified. When the numerical value of δ is much smaller than the wave length of the electromagnetic wave emitted from the radiation source 16, equation (32) can be replaced by its approximate form $$\delta = \frac{C}{\omega} \; \frac{v_1 - v_2}{\sqrt{1 - v_1 v_2}}. \quad (35)$$

It is now recognized that the present invention teaches methods for measuring the distance and/or the time rate of change of the distance between the wave transmitter and the target object by using the phase angle difference between two alternating electrical signals respectively representing the transmitted wave emitted from the wave transmitter and the reflected wave detected by the wave receiver and/or the time rate of change of the phase angle difference. As a consequence, the present invention also teaches methods for determining the phase angle difference between two alternating electrical signals oscillating at the same frequency respectively given by equations $$E_1 = A \sin(\omega t - \alpha), \quad (36)$$

and $$E_2 = B \sin(\omega t - \beta). \quad (37)$$

It can be easily shown that equations (36) and (37) satisfy the following relationships:

$$E_2 = B \sin(\alpha - \beta), \text{ when } E_1 \text{ reaches a zero value,} \quad (38)$$

$$E_2 = B \cos(\alpha - \beta), \text{ when } E_1 \text{ reaches a peak value.} \quad (39)$$

According to equations (38) and (39), the phase angle difference (α−β) can be determined as a function of a first normalized value of one of the two alternating electrical signals measured at a first instant when the other of the two alternating electrical signals reaches a zero value or a second normalized value of one of the two alternating electrical signals measured at a second instant when the other of the two alternating electrical signals reaches a peak value. The ratio of equation (38) to equation (39) yields relationship $$\frac{E_2\big|_{E_1=0}}{E_2\big|_{E_1=\text{PEAK}}} = \tan(\alpha - \beta). \tag{40}$$

According to equation (40), the phase angle difference $(\alpha-\beta)$ can be determined as a function of a ratio of a first value of one of the two alternating electrical signals measured at a first instant when the other of the two alternating electrical signals reaches a zero value to a second value of one of the two alternating electrical signals measured at a second instant when the other of the two alternating electrical signals reaches a peak value.

It can be also shown that equations (36) and (37) satisfy the relationship:

$$E_1 \frac{dE_2}{dt} - \frac{dE_1}{dt} E_2 = E_1 E_2 \omega \sin(\alpha - \beta), \tag{41}$$

and $$\frac{1}{\omega} \frac{dE_1}{dt} \frac{dE_2}{dt} + \omega E_1 E_2 = E_1 E_2 \omega \cos(\alpha - \beta). \tag{42}$$

According to equations (41) and (42), the phase angle difference $(\alpha-\beta)$ can be determined as a function of a differential combination of a product between the first of the two alternating electrical signals and the time derivative of the second of the two alternating electrical signals and a product between the second alternating electrical signal and the time derivative of the first alternating electrical signal, or an additive combination of a products between the time derivatives of the two alternating electrical signals divided by the circular frequency of the two alternating electrical signals and a product between the two alternating electrical signals times the circular frequency. Of course, the normalized form of the two alternating electrical signals must be used in determining the phase angle difference by the above-described method. The ratio of equation (41) to equation (42) yields equation $$\frac{E_1 \frac{dE_2}{dt} - \frac{dE_1}{dt} E_2}{\frac{1}{\omega} \frac{dE_1}{dt} \frac{dE_2}{dt} + \omega E_1 E_2} = \tan(\alpha - \beta). \tag{43}$$

According to equation (43), the phase angle difference $(\alpha-\beta)$ can be determined as a function of a ratio of a differential combination of a product between the first alternating electrical signal and the time derivative of the second alternating electrical signal and a product between the second alternating electrical signal and the time derivative of the first alternating electrical signal to an additive combination of a product between the time derivatives of the first and second alternating electrical signals divided by the circular frequency of the two electrical signals and a product between the first and second alternating electrical signals times the circular frequency.

It should be understood that the methods of the present invention for determining the velocity of the target object, the small distance between two surfaces, and the phase angle difference between two alternating electrical signals work with all kinds of alternating electrical signals of harmonic modes and other alternating electrical signals of nonharmonic modes which can be converted into the alternating electrical signals of harmonic modes. It should further understood that the numerical values of the explicit variables comprising the electrical signals and the time derivatives of the electrical signals may be taken continuously or intermittently in time in determining the numerical values of the physical variables of interest. While the principles of the inventions have now been made clear by the illustrative embodiments and the representative forms of the equations shown and described, there will be many modifications of the arrangement of the equations, terms and grouping of the terms in the equations and approximate forms of the equations, which are immediately obvious to those skilled in the art and particularly adapted to the specific working environments and operating conditions in the practice of the invention without departing from those principles. It is not desired to limit the inventions to the particular forms of the equations shown and described and accordingly, all suitable modifications and equivalents of those equations may be regarded as falling within the scope of the inventions as defined by the claims which follow.

The embodiments of the methods taught by the present inventions, in which an exclusive property or privilege is claimed, are defined as follows:

1. A method for determining a velocity of a target object comprising in combination:

a) transmitting a propagating wave towards a target object by emitting a transmitted wave from a wave transmitter;

b) detecting a reflected wave reflected from the target object by using at least one wave receiver;

c) obtaining two alternating electrical signals respectively representing the transmitted wave departing the wave transmitter and the reflected wave arriving at the wave receiver separately without superimposing the two alternating electrical signals to one another;

d) determining a phase angle difference between the two alternating electrical signals, and obtaining time rate of change of the phase angle difference; and e) determining a time rate of change of distance traveled by the propagating wave emitted from the wave transmitter, reflected by the target object and received by the wave receiver as a function of the time rate of change of the phase angle difference between the two alternating electrical signals.

2. A method as defined in claim 1 wherein the phase angle difference between the two alternating electrical signals is determined as a function of a linear combination of a first normalized value of one of the two alternating electrical signals measured at a first instant when the other of the two alternating electrical signals reaches a zero value, and a second normalized value of said one of the two alternating electrical signals measured at a second instant when said the other of the two alternating electrical signals reaches a peak value, a normalized value being a value of an alternating electrical signal divided by an amplitude of the alternating electrical signal.

3. A method as defined in claim 1 wherein the wave transmitter and the wave receiver are disposed at a common location, and the phase angle difference between the two alternating electrical signals is determined as a function of a normalized value of one of the two alternating electrical signals measured at an instant when the other of the two alternating electrical signals reaches a zero value, a normalized value being a value of an alternating electrical signal divided by an amplitude of the alternating electrical signal; and a time rate of change of distance between the target object and the wave transmitter is determined as a function of time rate of change of said phase angle difference.

4. A method as defined in claim 3 wherein said combination includes another wave receiver disposed at a location separated from the wave transmitter, and another pair of alternating electrical signals respectively representing the transmitted wave departing the wave transmitter and the reflected wave arriving at said another wave receiver are obtained; and the phase angle difference between said another pair of the alternating electrical signals is determined as a function of linear combination of a first normalized value of one of said pair of alternating electrical signals measured at a first instant when the other of said another pair of alternating electrical signals reaches a zero value, and a second normalized value of said one of said pair of alternating electrical signals measured at a second instant when said the other of said pair of alternating electrical signals reaches a peak value, a normalized value being a value of an alternating electrical signal divided by an amplitude of the alternating electrical signal; and a time rate of change of distance between the target object and said another wave receiver is determined as a function of time rate of change of said phase angle difference between said another pair of alternating electrical signals and the time rate of change of distance between the target object and the wave transmitter.

5. A method as defined in claim 1 wherein the phase angle difference between the two alternating electrical signals is determined as a function of a ratio of a first value of one of the two alternating electrical signals measured at a first instant when the other of the two alternating electrical signals reaches a zero value to a second value of said one of the two alternating electrical signals measured at a second instant when said the other of the two alternating electrical signals reaches a peak value.

6. A method as defined in claim 1 wherein the wave transmitter and the wave receiver are disposed at a common location, and the phase angle difference between the two alternating electrical signals is determined as a function of a ratio of a first value of one of the two alternating electrical signals measured at a first instant when the other of the two alternating electrical signals reaches a zero value to a second value of said one of the two alternating electrical signals measured at a second instant when said the other of the two alternating electrical signals reaches a peak value; and a time rate of change of distance between the target object and the wave transmitter is determined as a function of time rate of change of said phase angle difference.

7. A method as defined in claim 6 wherein said combination includes another wave receiver disposed at a location separated from the wave transmitter, and another pair of alternating electrical signals respectively representing the transmitted wave departing the wave transmitter and the reflected wave arriving at said another wave receiver are obtained; and the phase angle difference between said another pair of alternating electrical signals is determined as a function of a ratio of a first value of one of said another pair of alternating electrical signals measured at a first instant when the other of said another pair of alternating electrical signals reaches a zero value to a second value of said one of said another pair of alternating electrical signals measured at a second instant when said the other of said another pair of alternating electrical signals reaches a peak value; and a time rate of change of distance between the target object and said another wave receiver is determined as a function of time rate of change of said phace angle difference between said another pair of alternating electrical signals and the time rate of change of distance between the target object and the wave transmitter.

8. A method as defined in claim 1 wherein the two alternating electrical signals are normalized, normalizing being dividing a value of an alternating electrical signal by an amplitude of the alternating electrical signal, and the phase angle difference between the two alternating electrical signals is determined as a function of inverse of circular frequency of the two alternating electrical signals times a linear combination of a differential combination of a product between one of the two normalized alternating electrical signals and time derivative of the other of the two normalized alternating electrical signals and a product between said the other of the two normalized alternating electrical signals and time derivative of said one of the two normalized alternating electrical signals, and an additive combination of a product between time derivatives of the two normalized alternating electrical signals divided by the circular frequency of the two alternating electrical signals and a product between the two normalized alternating electrical signals times the circular frequency of the two alternating electrical signals.

9. A method as defined in claim 1 wherein the wave transmitter and the wave receiver are disposed at a common location, and the two alternating electrical signals are normalized, normalizing being dividing a value of an alternating electrical signal by an amplitude of the alternating electrical signal, and the phase angle difference between the two alternating electrical signals is determined as a function of inverse of circular frequency of the two alternating electrical signals times a differential combination of a product between one of the two normalized alternating electrical signals and time derivative of the other of the two normalized alternating electrical signals and a product between said the other of the two normalized alternating electrical signals and time derivative of said one of the two normalized alternating electrical signals; and a time rate of change of distance between the target object and the wave transmitter is determined as a function of time rate of change of the phase angle difference.

10. A method as defined in claim 9 wherein said combination includes another wave receiver disposed at a location separated from the wave transmitter, and another pair of normalized alternating electrical signals respectively representing the transmitted wave departing the wave transmitter and the reflected wave arriving at said another wave receiver are obtained, a normalized alternating electrical signal being the alternating electrical signal divided by an amplitude of the alternating electrical signal; and the phase angle difference between said another pair of normalized alternating electrical signals is determined as a function of inverse of circular frequency of said another pair of alternating electrical signals times a linear combination of a differential combination of a product between one of said another pair of normalized alternating electrical signals and time derivative of the other of said another pair of normalized alternating electrical signals and a product between said the other of said another pair of normalized alternating electrical signals and time derivative of said one of said another pair of normalized alternating electrical signals, and an additive combination of a product between time derivatives of said another pair of normalized alternating electrical signals divided by the circular frequency of said another pair of alternating electrical signals and a product between said another pair of normalized alternating electrical signals times the circular frequency of said another pair of alternating electrical signals; and a time rate of change of distance between the target object and said another wave receiver is determined as a function of said phase angle difference between said another pair of normalized alternating electrical signals and the time rate of change of distance between the target object and the wave transmitter.

11. A method as defined in claim 1 wherein the phase angle difference between the two alternating electrical signals is determined as a function of a ratio of a differential combination of a product between one of the two alternating electrical signals and time derivative of the other of the two alternating electrical signals and a product between said the other of the two alternating electrical signals and time derivative of said one of the two alternating electrical signals to an additive combination of a product between time derivatives of the two alternating electrical signals divided by circular frequency of the two alternating electrical signals and a product between the the two alternating electrical signals times the circular frequency of the two alternating electrical signals.

12. A method as defined in claim 1 wherein the wave transmitter and the wave receiver are disposed at a common location, and the phase angle difference between the two alternating electrical signals is determined as a function of a ratio of a differential combination of a product between one of the two alternating electrical signals and time derivative of the other of the two alternating electrical signals and a product between said the other of the two alternating electrical signals and time derivative of said one of the two alternating electrical signals to an additive combination of a product between time derivatives of the two alternating electrical signals divided by circular frequency of the two alternating electrical signals and a product between the two alternating electrical signals times the circular frequency of the two alternating electrical signals; and a time rate of change of distance between the target object and the wave transmitter is determined as a function of time rate of change of said phase angle difference.

13. A method as defined in claim 12 wherein said combination includes another wave receiver disposed at a location separated from the wave transmitter and another pair of alternating electrical signals respectively representing the transmitted wave departing the wave transmitter and the reflected wave arriving at said another wave receiver are obtained; and the phase angle difference between said another pair of alternating electrical signals is determined as a function of a ratio of a differential combination of a product between one of said another pair of alternating electrical signals and time derivative of the other of said another pair of alternating electrical signals and a product between said the other of said another pair of alternating electrical signals and time derivative of said one of said another pair of alternating electrical signals to an additive combination of a product between time derivatives of said another pair of alternating electrical signals divided by circular frequency of said another pair of alternating electrical signals and a product between said another pair of alternating electrical signals times the circular frequency of said another pair of alternating electrical signals; and a time rate of change of distance between the target object and said another wave receiver is determined as a function of time rate of change of said phase angle difference between said another pair of alternating electrical signals and the time rate of change of distance between the target object and the wave transmitter.

14. A method for determining a distance between two surfaces comprising in combination:

a) transmitting a propagating wave towards a target object including two surfaces with separation distance therebetween under measurement by emitting a transmitted wave from a wave transmitter;

b) detecting two reflected waves respectively reflected by the two surfaces of the target object by using at least one wave receiver;

c) obtaining a first alternating electrical signal representing the transmitted wave departing the wave transmitter, a second alternating electrical signal representing the reflected wave reflected by one of the two surfaces of the target object and arriving at the wave receiver, and a third alternating electrical signal representing the reflected wave reflected by the other of the two surfaces of the target object and arriving at the wave receiver;

d) determining a phase angle difference between the first and second alternating electrical signals, and a phase angle difference between the first and third alternating electrical signals; and e) determining the distance between the two surface as a function of a differential combination of the phase angle difference between the first and second alternating electrical signals and the phase angle difference between the first and third alternating electrical signals.

15. A method as defined in claim 14 wherein the second and third alternating electrical signals are normalized, normalizing an alternating electrical signal being dividing the alternating electrical signal by an amplitude of the alternating electrical signal; and the phase angle difference between the first and second alternating electrical signals is determined as a function of linear combination of a first value of the normalized second alternating electrical signal measured at a first instant when the first alternating electrical signal reaches a zero value and a second value of the normalized second alternating electrical signal measured at a second instant when the first alternating electrical reaches a peak value, and the phase angle difference between the first and third alternating electrical signals is determined as a function of a linear combination of a first value of the normalized third alternating electrical signal measured at a first instant when the first alternating electrical signal reaches a zero value and a second value of the normalized third alternating electrical signal measured at a second instant when the first alternating electrical signal reaches a peak value.

16. A method as defined in claim 15 wherein the phase angle difference between the first and second alternating electrical signals is determined as a function of one of said first and second values of the normalized second alternating electrical signal, and the phase angle difference between the first and third alternating electrical signals is determined as a function of one of said first and second values of the normalized third alternating electrical signal.

17. A method as defined in claim 14 wherein the first, second and third alternating electrical signals are normalized, normalizing an alternating electrical signal being dividing the alternating electrical signal by an amplitude of the alternating electrical signal; and the phase angle difference between the first and second alternating electrical signals is determined as a function of inverse of circular frequency of the first and second alternating electrical signals times a linear combination of a differential combination of a product between the normalized first alternating electrical signal and time derivative of the normalized second alternating electrical signal and a product between the normalized second alternating electrical signal and time derivative of the normalized first alternating electrical signal, and an additive combination of a product between time derivatives of the normalized first and second alternating electrical signals divided by the circular frequency of the first and second alternating electrical signals and a product between the normalized first and second alternating electrical signals times the circular frequency of the first and second alternating electrical signals, and the phase angle difference between the first and third alternating electrical signals is determined as a function of inverse of circular frequency of the first and third alternating electrical signals times a linear combination of a differential combination of a product between the normalized first alternating electrical signal and time derivative of the normalized third alternating electrical signal and a product between the normalized third alternating electrical signal and time derivative of the normalized first alternating electrical signal, and an additive combination of a product between time derivatives of the normalized first and third alternating electrical signals divided by the circular frequency of the first and third alternating electrical signals and a product between the normalized first and third alternating electrical signals times the circular frequency of the first and third alternating electrical signals.

18. A method as defined in claim 17 wherein the phase angle difference between the first and second alternating electrical signals is determined as a function of inverse of the circular frequency of the first and second alternating electrical signals times one of said differential and additive combinations of the normalized first and second alternating electrical signals and the time derivatives of the normalized first and second alternating electrical signals, and the phase angle difference between the first and third alternating electrical signals is determined as a function of inverse of the circular frequency of the first and third alternating electrical signals times one of said differential and additive combinations of the normalized first and third alternating electrical signals and the time derivatives of the normalized first and third alternating electrical signals.

19. A method for determining a phase angle difference between two alternating electrical signals comprising in combination:

a) taking the following two normalized values of one of two alternating electrical signals, a normalized value being a value of an alternating electrical signal divided by an amplitude of the alternating electrical signal; a first normalized value of one of the two alternating electrical signals measured at a first instant when the other of the two alternating electrical signals reaches a zero value, and a second normalized value of said one of the two alternating electrical signals measured at a second instant when said the other of the two alternating electrical signals reaches a peak value; and b) determining a phase angle difference between the two alternating electrical signals as a function of ratio of said first to second value of said one of the two alternating electrical signals.

20. A method for determining a phase angle difference between two alternating electrical signals comprising in combination:

a) normalizing two alternating electrical signals, normalizing an alternating electrical signal being dividing the alternating electrical signal by an amplitude of the alternating electrical signal;

b) forming the following two combinations of the two normalized alternating electrical signals and time derivatives of the two normalized alternating electrical signals; a differential combination of a product between one of the two normalized alternating electrical signals and time derivative of the other of the two normalized alternating electrical signals and a product between said the other of the two normalized alternating electrical signals and time derivative of said one of the two normalized alternating electrical signals, and an additive combination of a product between time derivatives of the two normalized alternating electrical signals divided by circular frequency of the two alternating electrical signals and a product between the two normalized alternating electrical signals times the circular frequency of the two alternating electrical signals; and c) determining a phase angle difference between the two alternating electrical signals as a function of ratio of said differential combination to said additive combination.

* * * * *